INVENTORS
LEWIS R. HEIM, DECEASED
BY FLORENCE H. VAN ETTEN AND
CHARLES R. HEIM, EXECUTORS

BY
Davis, Hoxie, Faithfull v Hapgood
ATTORNEYS.

Feb. 20, 1968

L. R. HEIM

3,369,285

APPARATUS FOR MANUFACTURING BEARINGS

Original Filed Nov. 18, 1960

INVENTORS
LEWIS R. HEIM, DECEASED
BY FLORENCE H. VAN ETTEN AND
CHARLES R. HEIM, EXECUTORS
BY
Davis, Hoxie, Faithfull & Hapgood
ATTORNEYS

INVENTORS
LEWIS R. HEIM, DECEASED
BY FLORENCE H. VAN ETTEN AND
CHARLES R. HEIM, EXECUTORS

BY Davis, Hoxie, Faithfull & Hapgood
ATTORNEYS

Feb. 20, 1968     L. R. HEIM     3,369,285

APPARATUS FOR MANUFACTURING BEARINGS

Original Filed Nov. 18, 1960     7 Sheets-Sheet 5

INVENTORS
LEWIS R. HEIM, DECEASED
BY FLORENCE H. VAN ETTEN AND
CHARLES R. HEIM, EXECUTORS

BY Davis, Hoxie, Faithfull & Hapgood

ATTORNEYS.

United States Patent Office 3,369,285
Patented Feb. 20, 1968

3,369,285
APPARATUS FOR MANUFACTURING
BEARINGS
Lewis R. Heim, deceased, late of Fairfield, Conn., by Florence H. Van Etten and Charles R. Heim, executors, Fairfield, Conn., assignors to The Heim Universal Corporation, Fairfield, Conn., a corporation of Delaware
Application Nov. 18, 1960, Ser. No. 70,875, now Patent No. 3,221,391, dated Dec. 7, 1965, which is a continuation-in-part of application Ser. No. 488,537, Feb. 16, 1955. Divided and this application Nov. 15, 1965, Ser. No. 507,971
3 Claims. (Cl. 29—200)

This application is a division of United States patent application Ser. No. 70,875, now Patent No. 3,221,391, granted Dec. 7, 1965, which is a continuation-in-part of United States patent application Ser. No. 488,537 filed Feb. 16, 1955, now abandoned. The invention relates to a novel apparatus for assembling the bearing combination.

In a broad sense bearings of the ball and socket type and the problems involved in making and maintaining them are old. They go back to the first animal life in which bones and joints were present. Their requirements are most exacting as to shape, dimension and strength. These bearings present unique problems of achieving a wide area of contact between ball and socket, and of achieving proper lubrication over this wide area of contact. They call for dimensional control of a high order.

In the last twenty years there has been a great increase in demand for such bearings in places where they encounter high temperatures and vibration resulting from high speeds, and yet have to be strong and dependable. This increase in demand has resulted in extensive research and experimentation and in a wide variety of bearing constructions. But the manufacture of these new bearings has become quite slow and costly, requiring greater forces, heavier and stronger machinery and an ever-increasing number of operations to produce them.

One objective of the invention is to provide a versatile, rapid and inexpensive apparatus of assembling bearing combinations of unbroken members, and also to provide an apparatus which can be accurately controlled. Another objective is to provide an apparatus for assembling a bearing combination with a minimum of applied force and a minimum of steps in the assembling operations.

In accordance with the present invention an unbroken inner member and an unbroken outer member are preformed, that is, before they are assembled with the inner member within the outer member they already possess the general shape they will have in the ultimate assembly; and at least one of them is made of ductile material. The outer member is sufficiently larger in diameter than the inner member so that the inner member can be moved freely into telescoped relation with the outer member. After the members are in telescoped relation the space between the members is diminished by deforming at least one of the ductile members in a radial direction throughout the length of the space.

With the foregoing and other objectives in view, I have devised the novel method with means by which it may be accomplished as illustrated in the accompanying drawings forming a part of this specification. It is, however, to be understood the invention is not limited to the specific details shown or described, but may embody various changes and modifications within the scope of the invention.

Figures 1, 2:
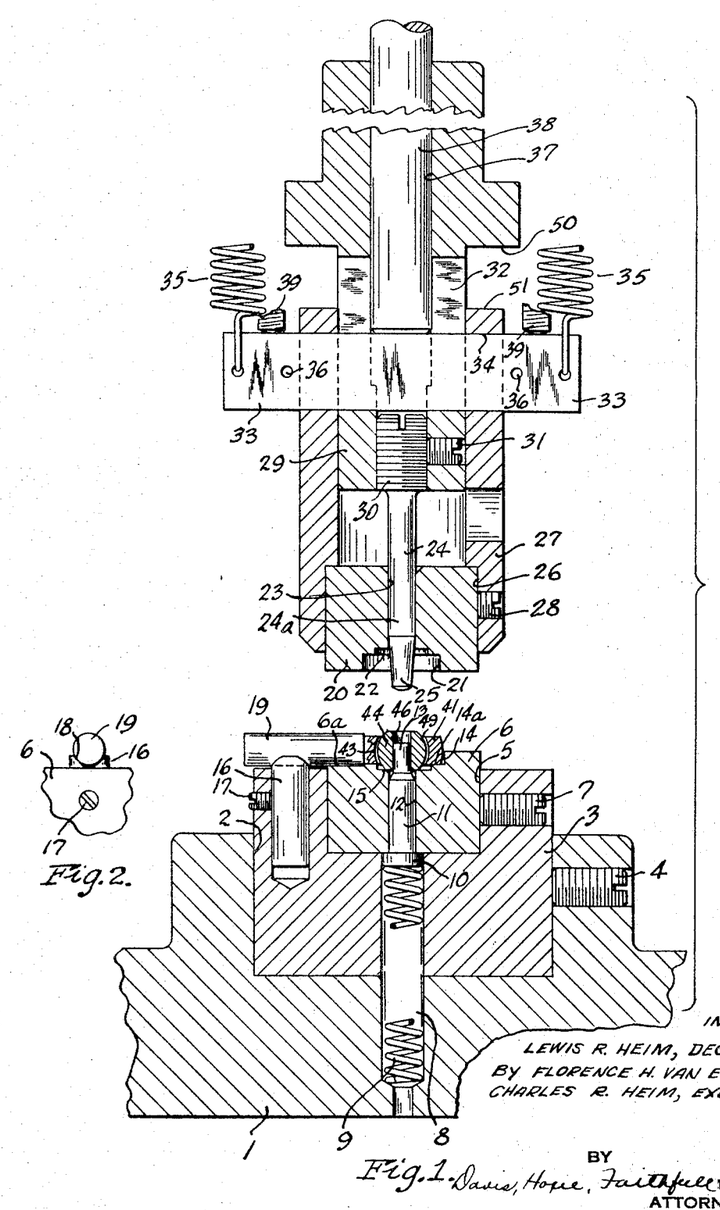
FIG. 1 is a vertical section through a set of dies which may be used in a power press, showing the operation thereof for carrying out this method, the movable die being shown in the raised or open position preparatory to performing the mounting operation.
FIG. 2 is a detail view of a positioning means for the element in which the bearing is to be mounted, looking from the left of FIG. 1.
Figure 3:
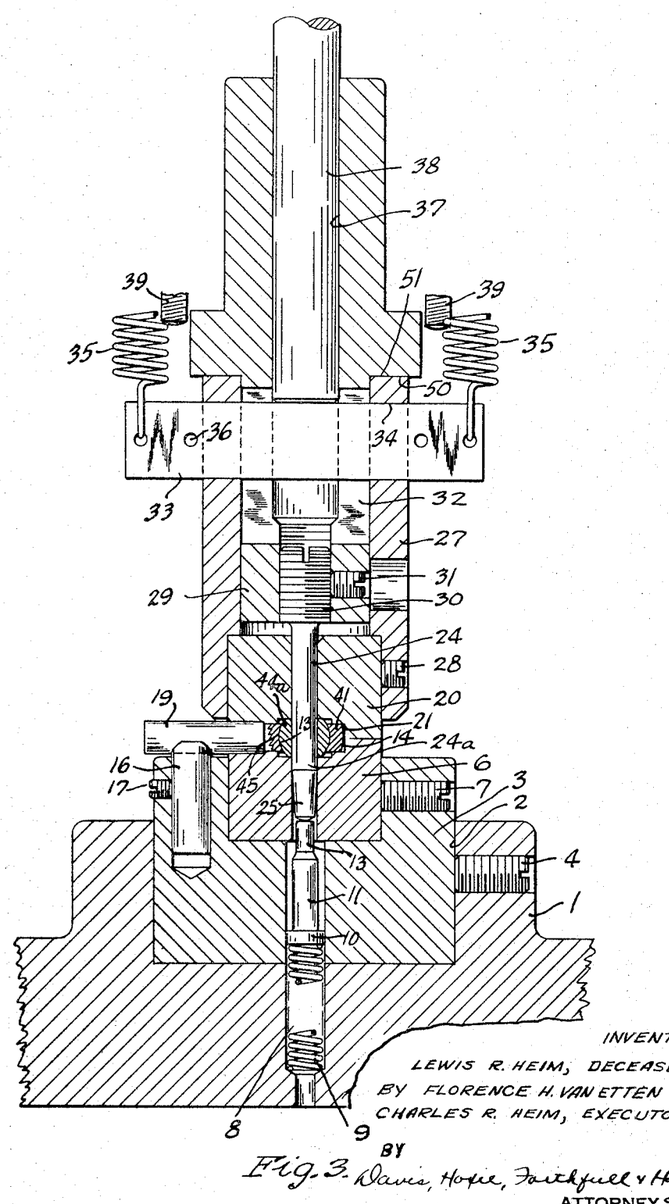
FIG. 3 is a sectional view showing the dies closed or with the upper die in the lower position after operating on the bearing to perform the mounting operation.

FIGS. 1 and 3 indicate a set of dies which may be used in a power press for effectively, rapidly and accurately performing this method of mounting the bearing, either a plain or a self-aligning bearing, in a lever or other machine element.

The die set is shown adapted for mounting in a suitable power press (not shown) for operation thereby, and comprises a die shoe 1 provided with a recess 2 in which is seated the lower die block 3 and which may be held in place by a set screw 4. This die block is provided with a recess or socket 5 in which is seated a lower die 6 which may be locked in place by a set screw 7. The shoe and block 1 and 3 are provided with a vertical opening 8 in which is a coil spring 9 pressing at its upper end against the under side of the head 10 of a slidable pilot 11, the head 10 being in the opening in the block and its body portion in an opening 12 in the die 6. The upper end of this pilot is reduced in diameter, as indicated at 13, and in the top of the die 6 is formed a recess 14, the opening 12 leading to the bottom of this recess. The recess in this particular form is a stepped recess with a reduced lower portion 15 for a purpose later to be described. Means may also be provided in the die block 3 for positioning the lever or other machine element in the dies while the bearing member is being mounted therein. That shown in these drawings, for example, comprises an upright pin 16 in a socket in the die block and held in different vertical positions by any suitable means, such as a set screw 17. It has a V or tapered recess 18 in its upper end in which may be seated the lever or other element, in the example shown the body of the end member 19, in which the bearing member is to be mounted, as will later be described. The die 6 may also be provided with a groove 6a in its top wall leading outwardly from the recess 14 in alignment with the notch 18 in the top of pin 16, in which groove a portion of the body of member 19 may lie.

The upper die and its mounting comprises the die 20 similar to and over the die 6 and having in its lower end a stepped circular recess 21, the stepped portion comprising a reduced portion 22 at the upper end of the recess. This recess is in alignment with the similar recess 14 in the lower die. This die has a passage or opening 23 therethrough in which is slidably mounted a punch 24 having a tapered and reduced lower end portion 25 extending into the socket or recess 21. This die 20 is mounted in a recess or socket 26 in the lower end of a hollow sleeve 27 and may be secured by a set screw 28. Mounted for limited longitudinal sliding movement in the sleeve 27 is a cylindrical block 29 forming a carrier for the punch 24, this punch having an enlarged threaded upper end 30 screw threaded into the lower end of the block 29 and may be secured in adjusted positions by a set screw 31. This block 29 is provided with a transverse elongated slot 32 extending therethrough in which is slidable a flat bar 33 projecting at its opposite ends through openings 34 in the sides of the sleeve 27, and springs 35 connected to this bar tend to lift it and the sleeve 27. Transverse pins 36 may be mounted in the bar 33 to keep it centered in the sleeve 27. The block 29 is provided with a longitudinal passage 37 in which is a plunger rod 38 normally engaging at its lower end on top of the bar 33. Adjustable set screws 39 mounted in the press form limit stops to limit the upward movement of the bar 33 and the elements connected therewith, as will later be described.

In carrying out this novel method of mounting a bearing member in the lever or other machine element, the lever or other machine element is provided with a hole or opening therethrough and then the bearing member of a suitable size and shape is placed in this hole and expanded into interlocking engagement with the element which is to provide a support therefor. Several different forms of the bearing and the supporting element in which it is to be mounted are shown in FIGS. 4 to 25 of the drawings.

Figures 4, 5, 6, 7, 8, 9, 10, 11, 12, 13, 14, 15, 16, 17, 18, 19:
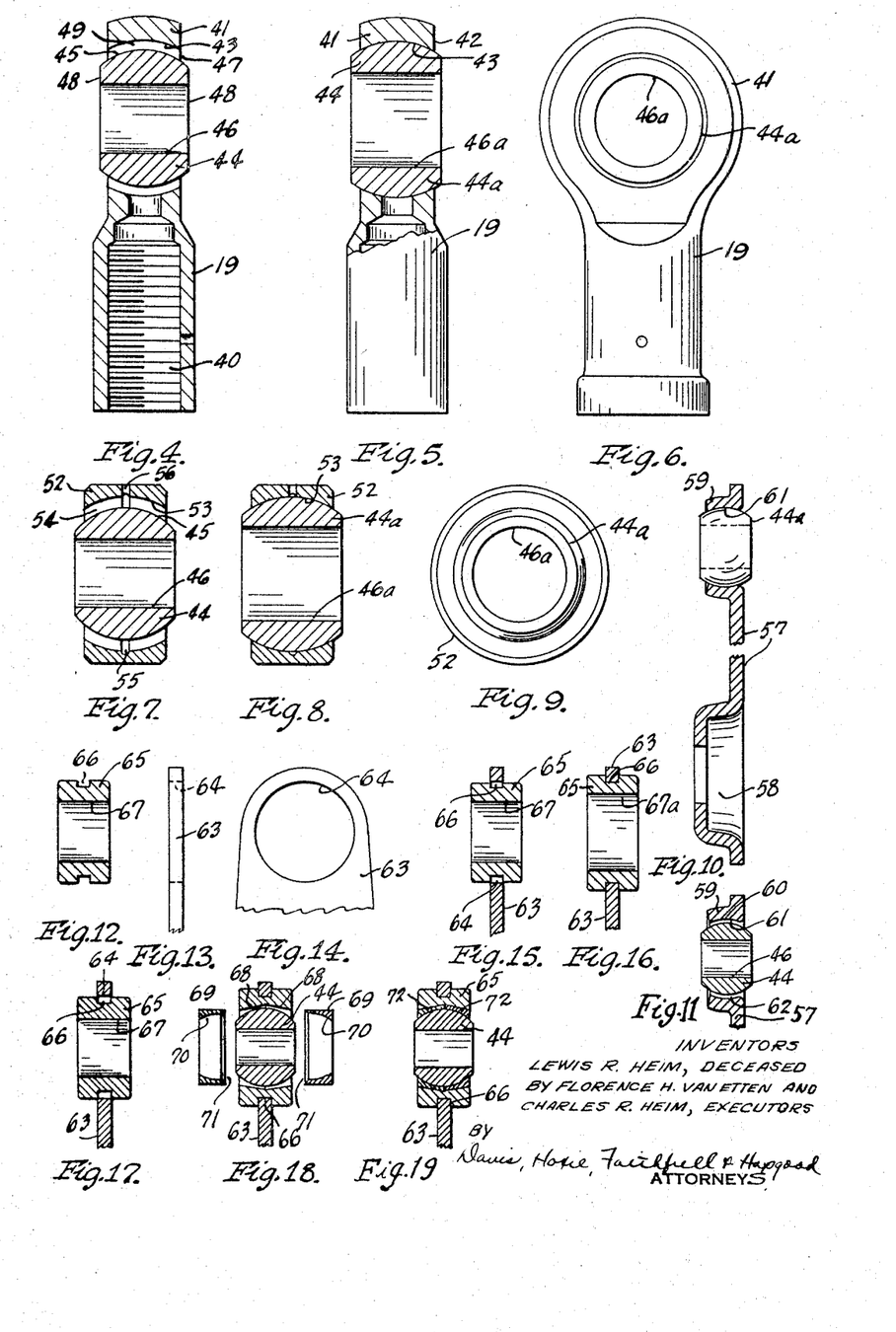
FIG. 4 is a longitudinal section of an end member for a rod or cable, indicating the first steps in performing this method in mounting a bearing therein.
FIG. 5 is a similar section showing the end member and the bearing after completing the operation of mounting the bearing in the end member.
FIG. 6 is a side view looking from the right of FIG. 5.
FIG. 7 is a section of a mounting ring and bearing indicating the first steps of mounting the bearing in the ring.
FIG. 8 is a similar section showing the bearing mounted in this ring.
FIG. 9 is an end view looking from the right of FIG. 8.
FIG. 10 is a longitudinal section of a portion of one form of a lever indicating one form of this bearing mounted therein.
FIG. 11 is a similar section of the end portion of a lever and the bearing of FIG. 10 showing the bearing in position for the expanding operation.
FIG. 12 is a section of a plain bearing which may be mounted in a lever or a machine element by this method, and also may be used not only as a bearing member itself but may be used as a bearing member to support another and self-aligning bearing.
FIG. 13 is a side view of the end portion of a lever in which this bearing member of FIG. 12 may be mounted.
FIG. 14 is a side view thereof looking from the right of FIG. 13.
FIG. 15 is a section of the bearing member and lever of FIGS. 12 and 13 showing the first steps of mounting the bearing member in the lever.
FIG. 16 is a similar section to FIG. 15 showing the elements after the completion of the operation of mounting the bearing member in the lever.
FIG. 17 is a section similar to FIG. 15 indicating the first steps of mounting the bearing member of FIG. 12 in the lever preparatory to using this bearing member as the support for a self-aligning bearing member.
FIG. 18 is a section indicating the first steps of mounting the self-aligning bearing in the plain bearing member of FIG. 17.
FIG. 19 is a section showing the completion of the operation of mounting the self-aligning bearing in the bearing member of FIG. 17.

Referring first to FIGS. 4, 5 and 6, which is also the construction illustrated as an example in FIGS. 1, 2 and 3, being operated upon to carry out this method in the die arrangement shown, at 19 is shown a machine element, in this case comprising the end member of a rod or cable used in the machine, and may be connected to this end member by any suitable means, as by threading it into the internal threads 40 of the body portion of this member. At its upper end it is provided with a substantially circular head portion 41 which may also be flattened on its opposite sides 42, and it is provided with a circular opening having peripheral side walls 43 which are formed as part of the surface of a sphere and so will be called a spherical surface. The bearing member 44 is made of any suitable ductile material, such as a suitable ductile metal, and may be, for example, a suitable heat-treatable and hardenable steel, and is formed with an outer spherical surface 45 and a cylindrical longitudinal bearing opening 46 therethrough. This bearing member is made of sufficiently smaller diameter than the diameter of the ends 47 of the opening 43 so that it can be placed within this opening with its outer spherical surface 45 spaced from the spherical surface 43 of the opening. The member 44 is then expanded to 44a to bring its outer spherical surface 45 into engagement with the spherical surface 43 of the opening to thus interlock the bearing member 44a with the mounting element 19, and in this case for universal self-aligning connection therewith, as the spherical surfaces permit universal rocking as well as turning movement in the head 41 of member 19. In the operation shown in these drawings, the bearing member 44 is expanded by forcing a punch through the opening 43 of larger diameter than this opening, so that in expanding the bearing member this plain bearing opening 46 is also expanded to a larger diameter, as shown at 46a in FIG. 5. The bearing member, however, may be expanded into interlocking engagement with the machine element 19 by either expanding it from the opening 46 or by longitudinal pressure on the opposite ends 48 of the bearing member while the side walls of the opening 46 are held against contracting; or it can be expanded by a combination of both of these actions, that is, both by expanding from the interior opening and by longitudinal pressure on the opposite ends of the bearing member, performed either in succession or simultaneously.

In the operation of carrying out this method, in the die set shown in FIGS. 1 and 3, the lever or other machine element, in the example shown the end member 19, is placed on the lower die 6 with its head portion 41 seated in the recess 14 on the bottom wall 14a thereof and its body portion seated in the groove 6a and recess 18, and the bearing member 44 is placed in the opening 43 resting on the bottom wall 15 of the recess and centered by means of the upper end 13 of the pilot 11 extending into the opening 46 in the bearing member, this end of the pilot being the same size as this opening. The lower wall 15 of the recess also properly positions or centers this bearing member with respect to the thickness or transverse width of the head 41 of the machine element. As previously described, the bearing member 44 is smaller than the opening 43 by the desired amount to provide the clearance space 49 between them and permit the bearing member to be placed in opening 43. In this position the pilot 11 is held in its upper position by the spring 9 with its upper reduced end portion 13 in and fitting the hole 46 provided in the bearing member 44. This properly centers the bearing member in the machine element and holds it in the centered and upright position in alignment with the recess 21 in the upper die and the lower tapered end 25 of the punch 24. When the upper die and punch are lowered against these members, as indicated in FIG. 3, in this operation all of the members including the die 20, sleeve 27, block 29, bar 33 and plunger 24 move downwardly together under action of the power press until the lower end of the die 20 rests on top of the lower die 6, as shown in FIG. 3, if the bearing member 44 is to be expanded from the inside by the action of the plunger 24 only. This arrests downward movement of the die 20, the sleeve 27, bar 33 and the plunger 38. Then the block 29 and the punch 24 continue to move downwardly, forcing the tapered lower end 25 of the punch through the opening 46 in the bearing member 44, and the punch is carried far enough to pass the tapered end portion 25 through the bearing member and until its cylindrical body portion 24a also passes into and through the bearing member, as indicated in FIG. 3, the punch in this movement forcing the pilot 13 downwardly out of the opening in the bearing member. As the body 24a of the punch 24 is of larger diameter than the hole 46 in the bearing member, it will expand this member into the opening 43 in the machine element, thus filling this opening and causing the outer spherical surface 45 of the bearing member to closely fit the spherical opening 43 of the machine element, and the relative sizes can be so proportioned that at the end of this expanding operation the bearing member 44a has a good bearing fit in the hole or opening 43 in the machine element, permitting universal movement of the bearing member in the element and permitting self aligning of the bearing member. This expanding of the bearing member into the spherical hole in the machine element also interlocks the bearing member with the machine element to effectively mount and secure this bearing member in the element.

If the bearing member is being compressed axially or longitudinally, then the die 20 stops its downward travel when the upper end of the bearing member 44 is engaged by the top wall 22 of the cavity or recess in the upper die 20. Block and punch 24 continue their downward movement and die 20 resumes its downward travel when shoulder 50 on the block 29 hits the upper end 51 of the sleeve 27. The die 20 is then carried down under power to longitudinally compress the bearing member 44 until the lower end of the die 20 rests on top of the lower die 6. This arrests downward movement of the die 20 and the sleeve 27, bar 33 and the plunger 24. The downward movement of the punch 24 has carried its tapered lower end 25 through the opening 46 in the bearing member, and the punch is carried far enough to pass this tapered end through the bearing member until the cylindrical portion 24a of the punch also passes into and through the bearing member, as indicated in FIG. 3, the same as described above. If the body portion 24a is of the same size or only slightly larger than the opening 46 in the bearing member 44, then this member will be expanded into the hole 43 of the machine element by the longitudinal pressure of the dies only on this member while the sides of opening 46 are supported and prevented from collapsing inwardly by the punch 24. If the body portion 24a of the punch is larger than the hole 46 in the bearing member, it will assist the longitudinal pressure of the bearing into a good bearing fit with the hole 43 in the machine element. Thus in this operation the ball or bearing member 44 is expanded by the tapered punch and by longitudinal end pressure on this member. These actions can be minutely controlled by the size of the punch and the bearing member and the size of the opening in this bearing member, and also depending on how far down the bearing member is squeezed or compressed axially by the dies.

Thus, as indicated, this expanding and sizing operation of the bearing member 44 to interlock it with the supporting machine element may be performed solely by the expanding action of the punch passing through the bearing member; or the die could be so designed that there is longitudinal pressure applied to the bearing member while the side walls of the opening therethrough are held against compressing inwardly while this longitudinal pressure is applied to the bearing, thus giving an expanding action on the bearing member by pressure on the opposite ends thereof. Thus the bearing member can be expanded and sized to the proper predetermined diameter and form by either the expanding action of the punch or the longitudinal pressure of the dies, or by both of these actions together, either in succession or simultaneously.

After the expanding and sizing operation is completed the entire upper die assembly moves upwardly to the predetermined stops 39 carrying the expanded bearing member and the machine element with it. The stops 39, as above indicated, may be comprised of adjustable set screws in the frame of the press, and these screws or stops engage the bar 33 while the die set is moving upwardly, thus holding bar 33, sleeve 27, and die 20 against further upward movement. Block 29 and punch 24 continue their upward movement, thus stripping the expanded bearing from the punch 24, after which block 29 and punch 24 continue upward movement until the full upper position is attained, as shown in FIG. 1, in preparation for the next sizing and expanding operation. At the termination of the stripping operation the expanded and sized, and therefore the completed, formed bearing in interlocking engagement with the machine element and the hole therethrough, may be removed from the operating area.

It will be seen that the expanding of the ball or bearing member 44 by forcing the enlarged punch therethrough will increase the diameter of the plain bearing opening 46 through the ball or bearing member as indicated at 46a in FIG. 5, and this plain bearing opening through the ball or bearing member can be accurately formed to the desired size for the member to be mounted in it by this action of the punch.

This thus mounted bearing may be used as formed, or it could be heat-treated or not as desired; the whole bearing may be heat-treated if desired, and if it is desired to heat-treat and harden the bearing member without correspondingly hardening the outer or machine element, the outer or machine element can be formed of non-hardenable or less hardenable material, while the inner or bearing member can be formed of hardenable material.

Other different forms of bearing and machine element for mounting it therein by this improved method are shown by way of example in FIGS. 7 to 25. In the form of FIGS. 7 to 9 inclusive the machine element or outer supporting member is indicated as a ring 52 provided with a hole therethrough having a spherical surface 53. Then the bearing member or ball 44 with its outer spherical surface 45 is formed of a size to be inserted in this hole 53 with a clearance 54 and its reduced opening 46 through it. Then this bearing member is expanded into interlocking engagement with the outer machine element or ring 52 and a good bearing fit in the spherical opening 53 by the expanding operations, as described in connection with FIGS. 1 to 6. Then this completed bearing, as shown in FIGS. 8 and 9, may be used by mounting in other machine elements or structures as desired. If desired, an oil groove 55 may be formed in the inner spherical surface 53 with an oil opening 56 leading thereto as indicated, for proper lubrication of the spherical surfaces. The same lubricating means could, of course, be applied to any of the other forms of bearing shown.

In FIGS. 10 and 11 it is shown how the bearing member may be mounted in and interlocked directly with the supporting lever or similar machine element. In this case the lever is indicated at 57 as a substantially flat member of suitable thickness provided with a pierced cupped portion 58 for connecting it to some element of a machine, for example, and adjacent the other end it is provided with a laterally extending circular flange 59, the hole 60 therethrough having a spherical inner surface 61. The reduced or undersized ball or bearing member 44 having its outer spherical surface, and being of sufficiently smaller size than the hole 60 through the lever, is placed in this hole as shown in FIG. 11, leaving the clearance space 62 between the outer spherical surface of the ball or bearing member and the inner spherical surface 61 of the hole through the lever. Then this ball or bearing member 44 is expanded into interlocking engagement with the lever and the spherical surface of the hole through it for mounting the bearing member in the lever and a good universal bearing fit therein, these expanding operations being performed by this method in the same manner as described above in connection with FIGS. 1 to 6.

In FIGS. 12 to 16 is shown by way of example how a plain bearing may be mounted in a lever or other machine element by this method, and such plain bearing may not be a self-aligning bearing. In this case a lever or similar machine element 63, one end portion only of which is shown, is provided with a transverse hole 64 therethrough. A bearing member 65 of suitable material is provided in the form of a ring having an external peripheral groove 66 in its outer wall surface, and a hole 67 therethrough forming a plain bearing. In mounting the member in a lever or machine element 63 the outer diameter of the bearing member 65 is substantially the same as or slightly smaller than that of the hole 64, and this bearing member is placed in this hole, as indicated in FIG. 15, with the outer groove or channel 68 in alignment with the edges of the opening 64. Then this bearing member 65 is expanded by the same means and method as described in connection with FIGS. 1 to 6, as indicated in FIG. 16, forcing the walls of the bearing member outwardly so that the peripheral edges of the hole 64 fit and seat in the external channel 66 to interlock the bearing member in the lever to mount it therein, the same as described in connection with the previous forms. If the bearing member is expanded by an enlarged punch forced through the opening 67, then the resulting opening or plain bearing 67a will be larger, the same as the result secured by this form of punch in the other forms. Also while the punch is being forced through the opening in member 65, this member may be compressed longitudinally to insure tight interlock with the edges of the opening in member 63.

In FIGS. 17 to 19 is shown how by this method this plain bearing member 65 may be mounted and interlocked with the supporting lever 63 or other machine element and used either by itself as a plain bearing member, as shown in FIG. 16, or it may be used as a means of mounting a self-aligning or ball bearing member 44, the same as in the other forms. In FIG. 17 this plain bearing member 65 of reduced size is shown as placed in the hole 64 in the lever or machine element 63 preparatory to the expanding operation to interlock it with and mount it in this machine element, as shown in FIG. 15. It may then be expanded to the position of FIG. 16, to interlock it with the supporting element 63. Then the interior opening, which is now the opening 67 enlarged, may be machined to form an interior spherical surface into which the ball or bearing member 45 may be expanded directly, as in the forms of FIGS. 4 to 8; or if preferred, the hole through the member 65 may be tapered from its opposite ends, as indicated at 68. Then the ball or bearing member 44 may be placed in this opening and mounted therein for self-aligning action by means of the bearing inserts 69 forced into the space between the outer spherical surface of the bearing member 44 and the inner inclined surfaces 68 of the bearing member 65. These bearing inserts are ring members as indicated in FIG. 18, of an outer diameter to pass into the outer ends of the tapered opening in the member 65 and have interior spherical surfaces 70. As these inserts are forced into the opening in the bearing member 65 from the opposite sides thereof, their thinner inner edges 71 engage the outer spherical surface of the bearing member 44, and these inserts are expanded into the tapered opening 68 so as to closely fit the tapered walls of this opening to interlock them with the member 65, and their inner surfaces closely grip the outer spherical surface of the member 44 to form a good self-aligning bearing therewith, and also to interlock this bearing member 44 with these inserts and the member 65 to lock it in this member and the machine element 63. These inserts are shown in this expanded and interlocked position at 72 in FIG. 19.

Figure 20:
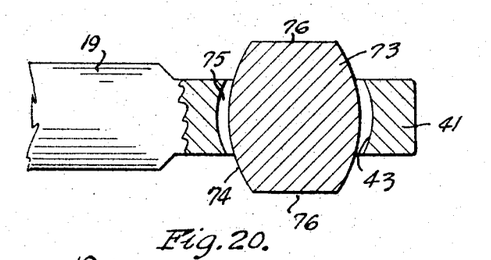
FIG. 20 is a partial side elevation and partial section of a portion of an end member of a rod or cable indicating the first steps of a modification of this method.
Figure 21:
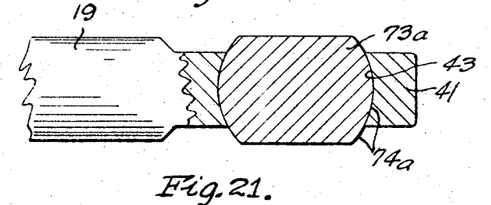
FIG. 21 is a similar section showing the bearing member mounted in the end member.
Figure 22:
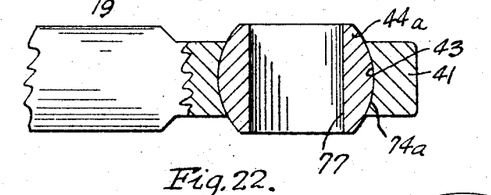
FIG. 22 is a similar section showing the bearing completed.
Figure 23:
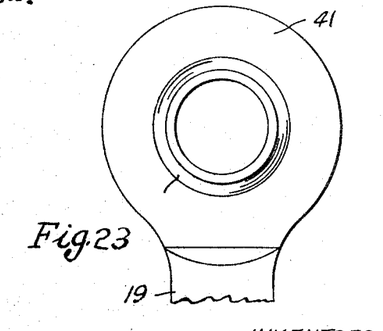
FIG. 23 is a side view thereof.

In FIGS. 20 to 23 is shown a slight modification. In these figures the machine element in which the bearing is to be mounted is the end member 19 of FIGS. 4 to 6 having formed in the circular head portion 40 thereof the transverse hole having the internal spherical surface 43. Any of the other forms could be used. The bearing member to be mounted in this hole and interlock therewith by expanding this bearing member into this spherical opening is shown as a solid blank or ball 73 which has an outer convexly curved surface 74 of sufficiently smaller diameter than that of the opposite ends of the hole 43 so that this blank or bearing member 73 may be placed in this hole, as shown in FIG. 20, with the proper clearance 75 between them. This member 73 may be substantially spherical, that is have a spherical outer surface 74, or it could be an ellipsoid, as shown, with its outer surface 74 convexly curved longitudinally, but either formed on the flatter arcs of the sides of an ellipse or on the arcs of circles of greater diameter than the diameter of this member. Then this member is expanded into the spherical opening 43 by longitudinal pressure on the opposite ends 76 of this bearing member, either in the dies of FIGS. 1 and 3, used without the punch 24, or by other suitable means. The ellipsoid or somewhat flattened curve of the outer surfaces 74 shown in FIG. 20, or that is, the longitudinally convexly curved surface on a longer and flatter curve than would be a spherical surface, gives a somewhat more uniform expansion of the member 73 into the spherical opening 43 under the longitudinal pressure on the member 73. This is because with this form the variations in thickness of the blank between its longitudinal center and its ends is less at different transverse planes and the metal has less tendency to pile up, so to speak, at the center of the blank than with the spherical outer surface. In other words, it tends to expand more evenly throughout the length of the blank, although a blank with the spherical outer surface could be used, if desired. Under this longitudinal pressure on the opposite ends of this blank it is shortened and expanded outwardly, as shown in FIG. 21, to member 73a, with its outer surface 74a now fitting and interlocking with surface 43 of the machine element 41, to thus mount the bearing member in this element for universal or self-aligning movement. A plain bearing opening 77 can then be drilled through expanded member 73a, as indicated in FIG. 22, forming the complete bearing 44a.

Figure 24:
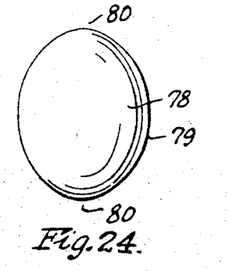
FIG. 24 is a side view of one element which may be used for the self-aligning bearing member.
Figure 25:
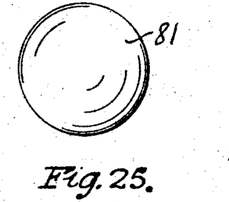
FIG. 25 is a similar view of another form of this element.

In FIGS. 24 and 25 are shown other solid balls or bearing members which may be expanded into the spherical opening 43 of the machine element 19, as shown in FIGS. 20 to 22. In FIG. 24 the ball and machine element is an elongated element 78 with a convexly curved outer surface 79 similar to that of 74 in FIG. 20, except that the opposite ends 80, instead of being flattened as shown in FIG. 20 are made rounded as shown. This element is placed in the openings 43 the same as that shown in FIG.

20, and then expanded into interlocking engagement with the sides of this opening by longitudinal pressure on the opposite ends thereof into the position shown in FIG. 21. This longitudinal compressive action would also flatten the opposite ends of this member after expanding into this opening 43, and it can then be drilled for the plain bearing 77 as shown in FIG. 22.

In FIG. 25 the insert bearing member 81 is shown as a sphere instead of an elongated member as in FIG. 24. This sphere, however, is placed in the opening 43 the same as the member 73 in FIG. 20 and then expanded to fit and interlock with the walls of the opening 43 by longitudinal pressure on opposite sides of the spherical member 81, thus flattening the opposite sides of this ball and expanding it into interlocking engagement with the sides of the opening 43, after which it may be drilled for the plain bearing 77 the same as shown in FIG. 22.

It will thus be seen from the above that in all of these forms the lever or machine element in which the bearing member is to be mounted is formed with a transverse hole through it. This hole may be either of a spherical or a straight surface, or other suitable shape, and then the inner bearing member of a smaller size than this hole and provided with means on its outer surface adapted to interlock with the edges of the hole in the machine element for mounting it therein, is placed in this hole and then expanded into interlocking engagement with the lever or other machine element to mount this bearing therein; also that several different forms of bearing and of the hole in the machine element are shown by way of example. It will also be understood that the operation of mounting the bearing member in the machine element by the expanding operation is a very simple one and may be quickly and acurately performed and the operations can be accurately controlled to provide an accurate and properly operable mounting for the bearing member in the machine element. Further, the bearing so mounted may be used without further treatment, or it can be heat-treated if desired, as described above.

Figure 26:
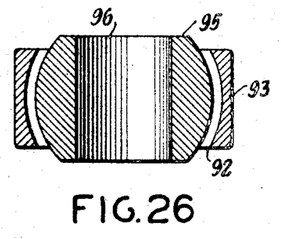
FIG. 26 is a side sectional view of a self-aligning bearing prior to assembly and radial contraction of its outer race.

FIG. 26 shows an unbroken inner bearing member 95, having a convexly curved outer surface, and hole 96 through the member; and an unbroken outer bearing member 93 having a concave inner surface, formed in the shape of a ring. This outer bearing member may be either an individual race of a self-aligning bearing or a lever or similar machine element. As seen in FIG. 26, the outer bearing member 93 when placed telescopically over the inner bearing member 95 prior to assembly, has a gap 92 between the inner concave surface of member 93 and the other convex surface member 95.

Figure 27:
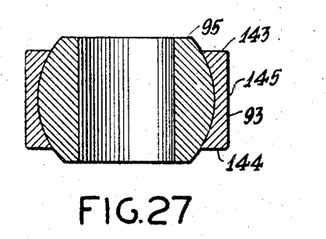
FIG. 27 is a side sectional view of the bearing of FIG. 26 subsequent to assembly and contraction.

In FIG. 27, the bearing is shown after its outer member 93 has been contracted radially inward so as to fit the inner bearing member 95 with the proper tolerance between the surfaces.

Figures 28, 32:
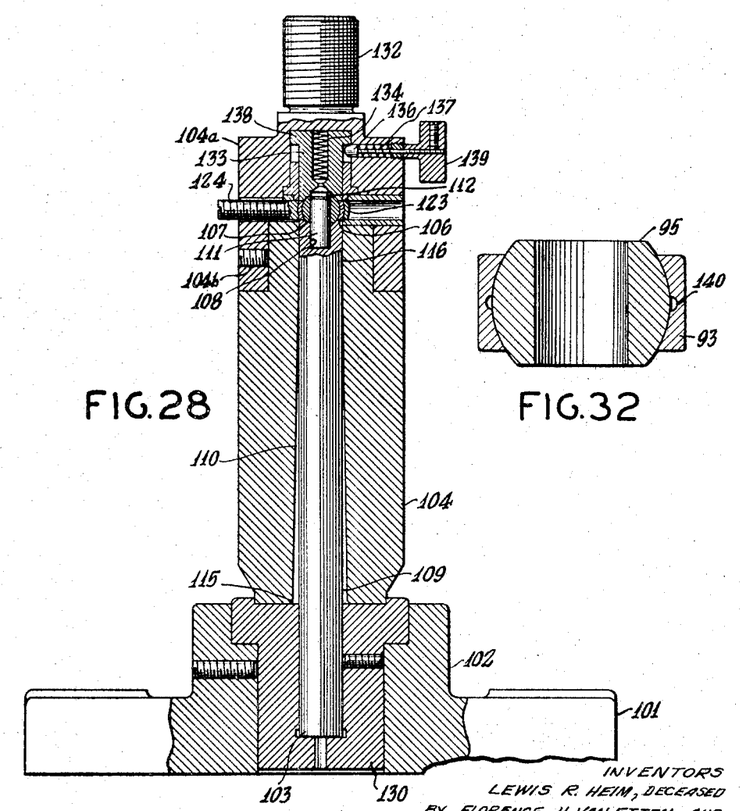
FIG. 28 is a vertical section through a contraction device suitable for making a rod end of FIGS. 30 and 31 with the outer die in its lowered position.
FIG. 32 is a side sectional view of another form of self-aligning bearing subsequent to contraction of its outer race.
Figures 29, 30, 31:
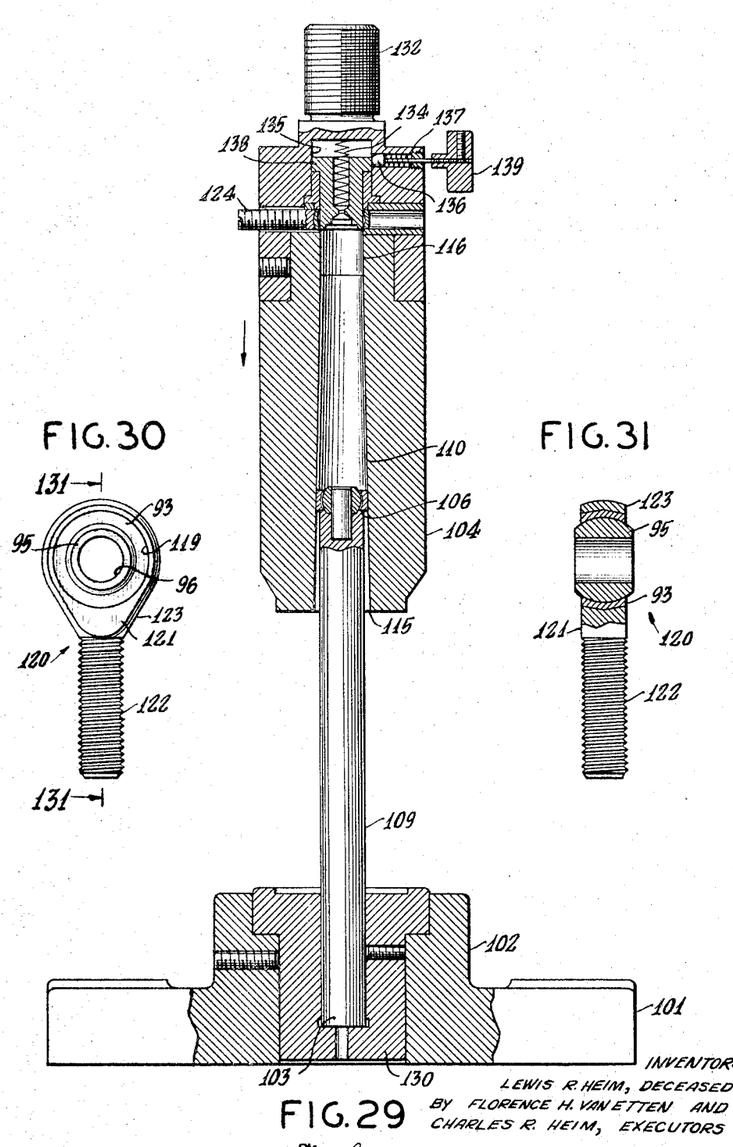
FIG. 29 is a vertical section of the contraction device of FIG. 28 with the outer die in its raised position.
FIG. 30 is a top view of a rod end bearing produced by the contraction device of FIGS. 28 and 29.
FIG. 31 is a side sectional view, along lines 131—131 of the rod end bearing of FIG. 30.

FIGS. 28 and 29 show one embodiment of a contracting device to produce the rod ends of FIGS. 30 and 31. It has an outer platform 101 and an integral intermediate portion 102 with an annular opening in which is mounted pedestal mount 130 having vertically mounted therein an inner round pedestal 103. Pedestal 103 has an approximately equal circumference along the length of its outer wall 109. Outer die 104 has a tapering inner wall 110 with its mouth portion 115 wider than its top portion 116. Die 104 is attached to upper member 104a by a screw 104b. Upper member 104a is mounted by screw member 132 to a ram (not shown) so that it can be raised and lowered. When lowered, die 104 surrounds pedestal 103 on its top and sides.

At the top of pedestal 103 are a ring-like rim 106 and a ring-like shelf 107 and a cavity 108, all circular and all adapted for the particular size of bearing to be produced. A pin 111 fits within the cavity 108 and also fits within a cavity 112 in the coining and centering member 133.

Member 133 is forced downwardly by spring 134 to hold an outer rod end member, described below, in position during the contraction operation. At the end of contraction, coining and centering member 133 coins the top face of the outer bearing member as described below, by pressing against it with a total force, for a bearing having an outside dimension of an inch, of 6–10 tons. Such pressure forces member 133 upward into cavity 135 against spring 134. Member 133 is held in its top position by finger 136 then being inserted, by spring 137, under flange 138 of member 133. Finger 136 is attached to handle 139 and may be withdrawn from under flange 138 by operation of the handle.

In the operation of the contracting device of FIGS. 28 and 29 the outer member 93 and the inner member 95 with hole 96 in it, are placed on the rim 106 and shelf 107, respectively. The inner member 95 is then secured against horizontal movement by the pin 111 which fits within hole 96. Downward vertical movement by the inner member 95 is prevented by the shelf 107. The die 104 is then positioned so that its mouth portion 115 surrounds the outer member 93 which has been positioned telescopically over inner member 95. The die 104 then descends, forced downwardly by the ram. If the outside diameter of member 93 is about one inch, the pressure is 4–6 tons. Outer member 93 is caused to contract radially inward by radial pressure imparted by the tapered wall 110. This contraction of outer member 93 against inner member 95 assembles the bearing with the predetermined fit when the spring-back of the metal after removal from the die is taken into account. The last portion of the downward stroke of die 104 coins the top and bottom of outer member 93 by pressing it between member 133 and rim 106.

After removal from the apparatus, the bearing may be loosened by forcing the outer member against the inner member about its rim. The bearing, using the apparatus of this invention, may be made so exactly that this loosening step is not necessary. Through precise control of the dimensions of wall 110 of die 104, the extent of contraction of the outer member of the bearing may be exactly predetermined.

Prior to the descent of the die 104 the outer blank of rod end 120, comprising threaded shaft 122 and outer ringlike rim 123 with integral triangular portion 121 (see FIGS. 30 and 31), is inserted through opening 124 in outer die 104.

The rod end is held by a circular portion of coining and centering member 133 being removably inserted in its opening 119, as shown in FIG. 29. When die 104 has fully descended, its wall 110 passes beyond outer member 93. Member 93, which has been contracted by wall 110, then enters rod end 120 and is caused to expand into opening 119 in rod end blank 120, to interlock member 93 with the rod end, by the coining operation as described above. Rod end 120, with its bearing in interlocked fit, is removed as outer die 104 is raised.

Figure 34:
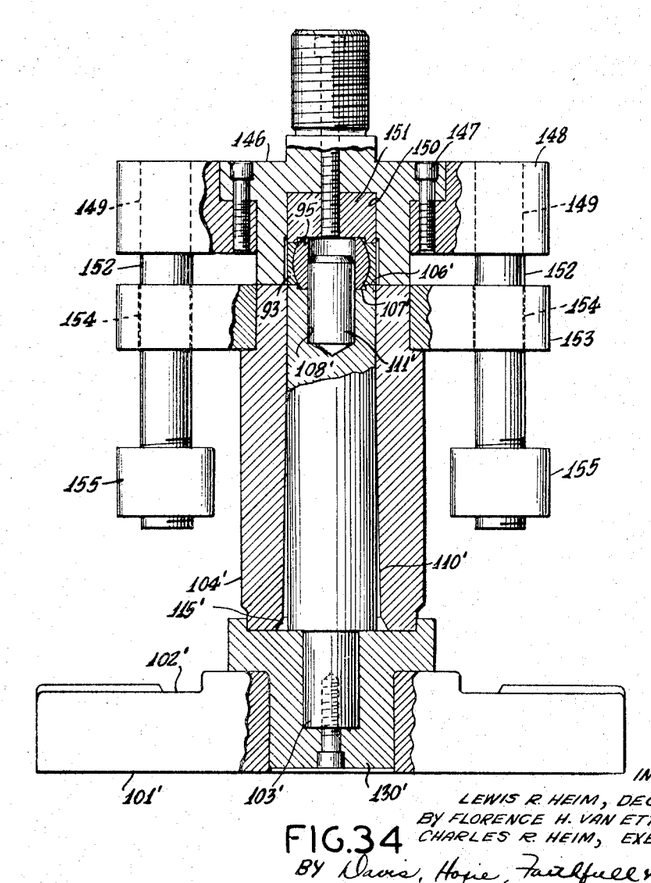
FIG. 34 is a vertical section of a contraction device suitable for making the self-aligning bearings of FIGS. 26, 27, and 32 with the outer die in its lowered position.

In another embodiment of this invention shown in FIG. 34, the contracting device is adapted for the production of bearings without simultaneous insertion of the bearing into a rod end member. This device is quite similar to the embodiment shown in FIGS. 28 and 29 except that there is no provision for the insertion or holding of a rod end member. In this embodiment the outer platform 101′, the intermediate portion 102′, the pedestal mount 130′, the pedestal 103′, the outer die 104′, the tapering inner wall 110′, the ring-like rim 106′, the ring-like shelf 107′, the cavity 108′, the pin 111′, the mouth portion 115′ of die 104′, and the ram are all of the same general structure and perform the same functions as the correspondingly numbered parts (without the prime designations) in FIGS. 28 and 29. The coining member 146 is fastened to top plate 148 by bolts 147. Top plate 148 which extends on both sides of coining member 146 has attached to it on each of its sides left and right rods 152. Coining block 151 is placed in the circular cavity 150 in the center of the coining member 146. Bottom plate 153 is secured to die 104'. Plate 153 has holes 154 which are slightly larger than the rods 152 which pass through the holes. The rods terminate in stop blocks 155.

In operation, with die 104' raised an outer member 93 is placed on rim 106' and an inner member is placed on shelf 107'. The mouth 115' of die 104' is lowered over outer member 93. Die 104' is pushed downward by pressure from coining member 146 on its upper end, and contraction and coining occur as described above. After the bottom of die 104' hits the top portion of pedestal mount 130' the ram is reversed and raised. Coining member 146 is lifted so that it moves away from die 104' until the stop blocks 155 hit the bottom of bottom plate 153 and lift it and die 104'. The separation of member 146 from die 104' is for easy removal of the assembled bearing.

It should be of course understood that the method just described can be used effectively without any coining step if desired.

The illustration shown in FIG. 32 demonstrates the versatility of the method. It has a lubrication groove 140 which is formed in the outer member prior to assembly.

After the above described radial contraction of the outer member takes place, with or without coining, as described, the member has certain metallurgical characteristics which are readily identifiable, as follows.

In contraction the outer member is subject to pressure high enough to cause deformation in an inward direction and in a longitudinal direction. Every point on the outer member moves inwardly about the same amount. The circumferential strain, i.e., the ratio equivalent to change in length divided by original length, is greater at the inner surface of the outer member than at the outer surface. In this embodiment all strains are in the plastic range.

Figure 33:
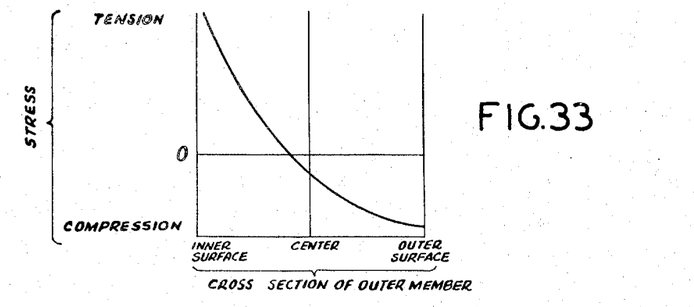
FIG. 33 is a schematic diagram of a section of an outer member along a radial line from inner surface to outer surface, showing its stress pattern after contraction.

The outer member resists the inward acting pressure with an internal force which produces compressive stress equal to the yield stress of the metal. This compressive stress remains as long as the inward pressure is applied. When the pressure is released at the top of wall 110 the outer member tends to spring back to its original shape and the stresses in member 93 change elastically. The higher strains at the inner face will be reduced by the spring back more than the strains at the outer face. As the net internal resisting force must be zero for the unloaded member as a whole a residual stress pattern is generated in which the inner portion is in a state of circumferential tension and the outer portion is in circumferential compression. A cross section of the outer member would give the appearance of an internal bending moment, as shown schematically in FIG. 33. This is the situation prior to coining.

During coining the outer member is compressed axially with the outer member in contact with the outer surface of the inner member. As the ends of the outer member move toward each other the curved surface of the inner member forces the metal to stretch outwardly. This stretching is greatest at ends 143 and 144 and zero at 145 midway between the ends. Resisting circumferential tension stresses equal to the yield stress at the ends and zero at the center are induced as a result. The circumferential stress is elastic in a narrow band at the center. The residual stress resulting from coining over-rides the residual stress resulting from the relaxation of the contractive pressure everywhere except in the narrow central band. Coining introduces axial stresses as well as circumferential stresses but when the coining pressure is removed the axial stresses are released. The final product after coining is a bearing with a circumferential residual pattern of compression stresses on the inside and tension stresses on the outside at the ends, and the opposite pattern midway between the ends. There is a transition from one to the other down the axis of the race. That is, the inner surface has residual compression stress at one end, no residual stress at some point between that end and the equator, residual tension stress at the equator, no residual stress at some point further along toward the other end, and residual compression stress again at the other end; whereas the outer surface has residual tension stress at one end, no residual stress at a point between the end and the equator, residual compression stress at the equator, no residual stress at some point further along toward the other end, and residual tension stress again at the other end.

By suitable techniques, such as X-ray analysis or stress gage and relaxation, these stress patterns may be ascertained and the member identified.

The method described above provides a top quality, precisely dimensioned bearing at low cost. Assembly requires less than ten seconds per bearing in the case of one example of contraction of an outer member with an outer diameter of one inch. It is versatile, permitting any desired features to be incorporated in the preformed members, as, for example, the lubrication groove 140 shown in FIG. 32. And it enables the manufacturer to control dimensions to a surprising degree. For example, an outer member emerges from the contraction die with its outer surface almost perfectly circular in cross section and often requiring no further work to achieve the required outer dimensions, and the same is true of the inner surface of an inner member after it has been expanded. Moreover, the method often achieves the required clearance between members without loosening.

The method requires little applied force, an example, as stated above, being force on the order of ten tons for contraction of an outer member one inch in diameter. This not only permits less expensive machinery to be used but it permits the members to be plated before assembly with soft plating materials without undue risk of loss of the plating material which would be a problem with greater forces.

What is claimed is:

1. Apparatus for the production and assembly of a bearing, the bearing prior to assembly comprising an inner member having a convex outer face and a hole through the member, and an outer member having a concave inner face, the apparatus including a pedestal for supporting the outer member, a pilot for supporting the inner member when it is inserted within the said hole, the pilot being movable axially into and out of the said hole, and a tapered punch comprising an outer tapering wall portion whose end fits within the said hole to cause the inner member to expand radially to fit the outer member with correct bearing tolerance, wherein the said tapered punch pushes the said pilot out of the said hole.

2. Apparatus as claimed in claim 1 and also including coining means adapted to exert axial pressure on an end of the outer member.

3. Apparatus as claimed in claim 1 and also including a spring which is positioned to act against the pilot.

References Cited

UNITED STATES PATENTS

| Re. 18,843 | 5/1933 | Skillman | 29—441 X |
| 2,185,483 | 1/1940 | Ward | 29—523 |
| 2,228,930 | 1/1941 | Robinson. | |
| 2,366,668 | 1/1945 | Heim. | |
| 2,462,138 | 2/1949 | Spangenberg. | |

THOMAS H. EAGER, *Primary Examiner.*